July 17, 1951   O. M. JENSEN   2,560,798
CHUCK
Filed March 2, 1949   2 Sheets-Sheet 1
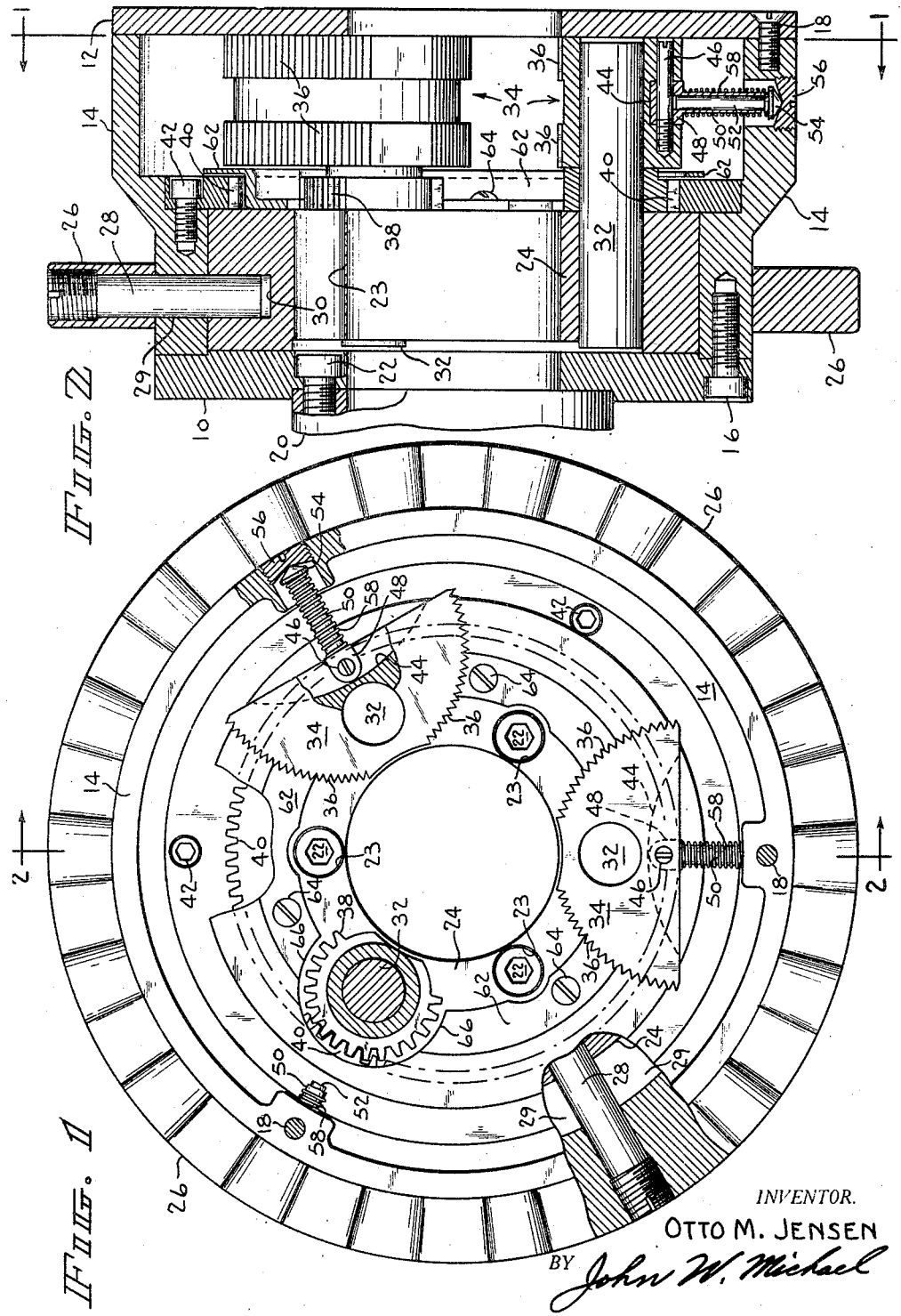
INVENTOR.
OTTO M. JENSEN
BY John W. Michael
ATTORNEY.

July 17, 1951  O. M. JENSEN  2,560,798
CHUCK
Filed March 2, 1949  2 Sheets-Sheet 2
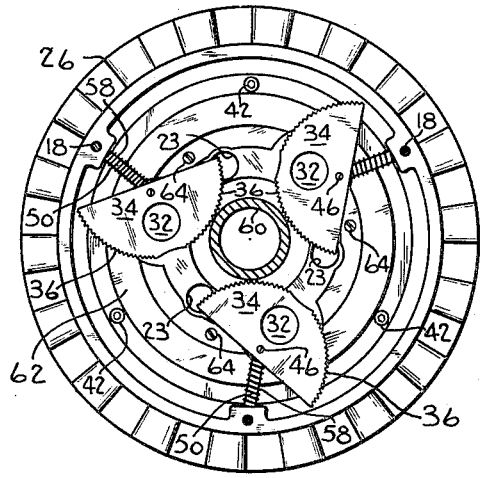
FIG. 3
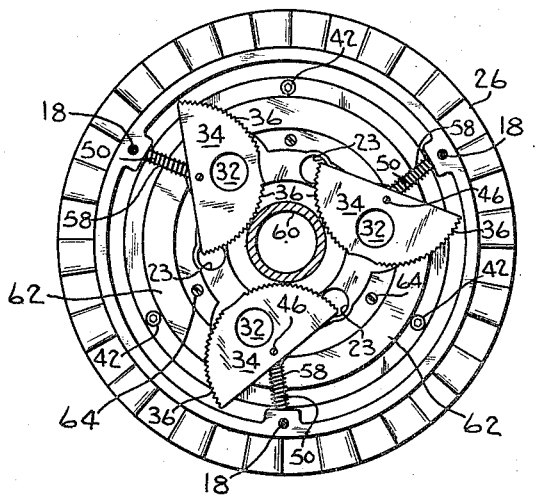
FIG. 4
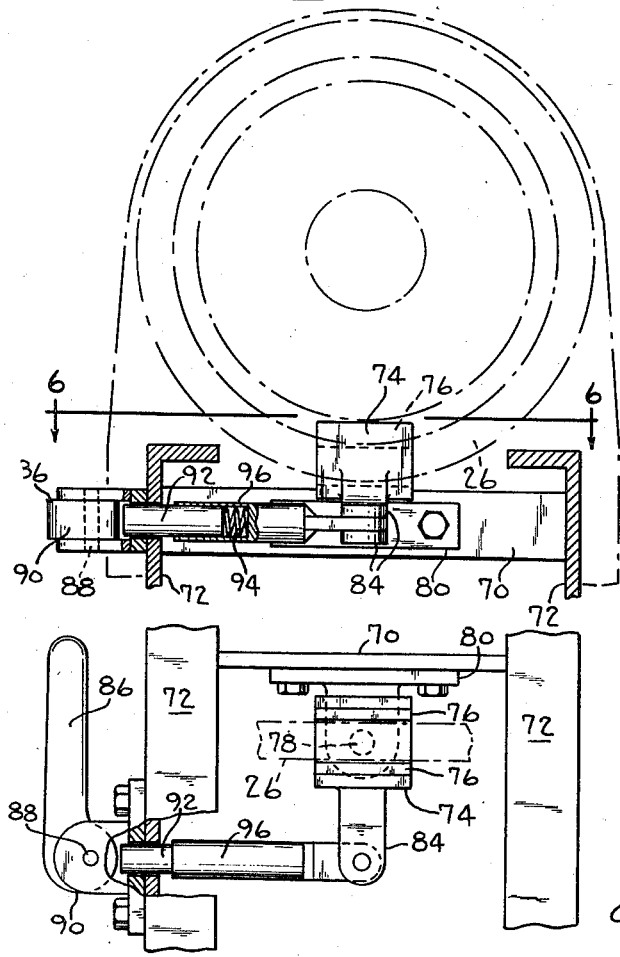
FIG. 5
FIG. 6
INVENTOR.
OTTO M. JENSEN
BY John W. Michael
ATTORNEY.

Patented July 17, 1951

2,560,798

UNITED STATES PATENT OFFICE 2,560,798

CHUCK

Otto M. Jensen, Racine, Wis., assignor to Peerless Machine Company, Racine, Wis., a corporation of Wisconsin Application March 2, 1949, Serial No. 79,142

11 Claims. (Cl. 279—113)

This invention relates to a chuck having jaws adapted for movement into and out of contact with work of various diameters and capable of holding the work for rotation in either direction.

While this invention is particularly useful with and is described with reference to pipe cutting machines, it will be apparent that its use is not so limited. The actual operations performed on pipe cutting machines are fairly rapid, but in prior machines a great percentage of the operator's time was spent in manipulating the chuck. This was especially true when the chuck had to be adapted for varying pipe sizes.

An object of this invention is to provide a chuck which is reliable, simple and rapid to operate.

Another object is to provide a chuck in which the work may be manipulated in preparation for an operation without stopping the rotation of the chuck.

A further object is to provide a chuck which is readily adapted to work diameters in a wide range.

Still another object is to provide a chuck which may be employed in driving the work in either direction.

A further object is to provide a chuck in which the work gripping force increases as the resistance to rotation increases.

A further object is to provide a chuck wherein the normal gripping force may be augmented.

Still a further object is to provide a chuck which reduces the operator's time spent in adjusting the chuck to a negligible amount.

Other objects and advantages will be pointed out in, or be apparent from, the specification and claims, as will obvious modifications of the single embodiment shown in the drawings, in which:

Fig. 1 is a front elevation of the chuck with the face plate removed and with parts broken away and removed to show various portions of the structure;

Fig. 2 is a vertical cross section taken on line 2—2 of Fig. 1;

Fig. 3 is a front elevation of the chuck with the face plate removed showing the jaws gripping a pipe for clockwise rotation;

Fig. 4 is a view similar to Fig. 3 but shows the jaws gripping the pipe for counterclockwise rotation;

Fig. 5 diagrammatically illustrates a brake device mounted between the ways of a pipe cutting machine provided with a chuck according to this invention shown in dotted lines; and Fig. 6 is a view taken on line 6—6 of Fig. 5 showing further details of the brake which may be utilized to augment the normal gripping force of the jaws.

Referring to the drawings in detail, rear plate 10 and face plate 12 are secured to housing 14 by means of screws 16, 18, respectively. The rear plate 10 is mounted on machine spindle 20 by means of a plurality of bolts 22. Thus housing 14 is driven by the machine spindle.

Annular carrier 24 is rotatably mounted within housing 14 and is provided with holes 23 affording access to bolts 22 for removing the chuck from the spindle. Hand wheel 26 having screws 28 projecting through suitable slots 29 in housing 14 and received in cooperating holes 30 in the carrier may be moved relative to the housing to rotate the carrier within the housing. Three parallel pins 32 are rotatably mounted in carrier 24 parallel to and equally spaced from the rotational axis of the chuck. An arcuate jaw 34 is rigidly mounted on each of the pins 32 and is provided with parallel serrations 36 on its curved face. It will be noted that pin 32 is off center with respect to the geometric center of arcuate jaw 34 so that rotation of the jaw about the axis of pin 32 causes the serrations to move in toward the center of the chuck to grip the work at varying distances from the center of the pin. Pinion gear 38 is fixed on pin 32 between carrier 24 and jaw 34 and engages ring gear 40 secured to housing 14 by means of bolts 42.

It will be evident that movement of hand wheel 26 causing carrier 24 to rotate within and with respect to housing 14 will result in gear 38 walking on ring gear 40 and rocking jaw 34 about the axis of pin 32 until the serrations contact and center the work.

To avoid interference with large diameter pipe inserted into the chuck, some of the teeth on pinion gear 38 are removed as seen in Fig. 1 and a portion of the curved surface of jaws 34 is machined to conform to the contour of the largest diameter pipe able to be inserted in the chuck. The removal of some of the gear teeth in this manner in no way affects the use of the chuck, since these teeth would not be utilized under any condition. Similarly, the removed serrated portion would serve no useful purpose if allowed to remain on the jaw.

As may be seen in Figs. 1 and 2, a screw 46 rotatably retains a member 48 in groove 44 in the generally diametrical rear surface of each jaw. Member 48 is provided with a radially (in Figs. 1 and 2) projecting sleeve 50 adapted to telescopically receive plunger 52 having conical head 54 abutting and seated in the conical inside surface of cap 56 threaded into the housing. Spring 58 is compressed between the flat underside of conical head 54 on plunger 52 and the shoulder portion of member 48 and retained in place by the telescopic assembly. Since the spring force is exerted on pin 46, rotation of each jaw 34 in either direction from the dead center position illustrated in Fig. 1 will cause the spring force to act off center with respect to the axis of pin 32, thus forcing the jaws in the direction in which jaw rotation was initiated. Thus the hand wheel need be rotated but a slight distance past the dead center position, at which time the spring force will take over and continue the rotation of the jaws until they contact the work. A further advantage of this arrangement resides in the spring increasing the gripping force of the jaws.

The operation of this chuck is simple. Starting with the jaws in the position illustrated in Fig. 1, rotation of hand wheel 26 in the counterclockwise direction will rock jaws 34 clockwise about pin 32 until they engage the work as illustrated in Fig. 4. If a force were now applied to pipe 60 in Fig. 4 tending to rotate the pipe in a counterclockwise direction, the tendency would be to drive jaws 34 further toward a smaller diameter position which, of course, is impossible without destruction of the pipe. With this in mind it will be apparent that the housing may now be driven in a clockwise direction to turn pipe 60 in a clockwise direction. Since the pipe is held against rotation in the counterclockwise direction, left hand threads may now be cut on the pipe. It should be noted that even while the machine is running, pipe 60 may be manually grasped and rotated clockwise to free it of the jaws and to permit movement of the pipe along the chuck axis. As soon as the pipe is released, the jaws will take over and grip it to prevent rotation in the counterclockwise direction. On the other hand, if hand wheel 26 is rotated in a clockwise direction from the dead center position of Fig. 1, the jaws rock counterclockwise about pins 32 to move in and hold the work against clockwise rotation. The spindle and housing may now be rotated in the counterclockwise direction for cutting right hand threads.

It will be evident upon consideration that this arrangement develops a considerable radial load on the jaws. The present structure absorbs the radial load in pins 32 while the driving force is transmitted through ring gear 40 and pinion gear 38. This distribution of the loads involved prevents excessive loads on any particular part.

To a large degree face plate 12 prevents the contact of any chips with the gearing, and guard 62 is secured to carrier 24 by means of screws 64 to protect the gearing. The guard is cut away at 66 to permit the gears to mesh, but the jaws overlie the cut out portion of the guard to cover the gearing in this area.

As pointed out above, the radial load is absorbed on the jaw mounting pins 32, and the driving force is transmitted to the jaws through the gearing resulting in increased gripping force with increased resistance to turning. Springs 58 bias the jaws into contact with the work upon rocking the jaws in either direction past the dead center position. This facilitates manipulation of the hand wheel and additionally serves to engage the serrations with the pipe surface. As is well known in the art, cast iron pipe is extremely difficult to grip without slippage, but with this chuck the pipe may be cut or threaded without any slipping occurring between the pipe and the jaws.

Should it be necessary to have even a greater gripping force, the brake illustrated in Figs. 5 and 6 may be utilized. This brake is mounted on a cross bar 70 between ways 72 of the pipe cutting machine bed and comprises a channelled piece 74 rotatable about pin 78 in bracket 80 and having brake pads 76 on the inside vertical surfaces. The brake pads 76 are adapted to engage the vertical sides of the hand wheel when the channel member 74 is cocked or rotated from the position illustrated as a force is applied to arm 84 projecting from pin 78. This force is applied by rotating handle 86 about its pivot 88 to bring cam surface 90 into contact with the end of plunger 92 to compress spring 94 within the tubular sleeve 96. The force exerted by the compressed spring 94 acts on lever arm 84 to cock channel 74 and bring the brake pads into contact with the hand wheel to resist movement of the hand wheel in the direction of spindle rotation. Thus in the position shown in Fig. 3 the hand wheel is rotated counterclockwise to hold the work against counterclockwise rotation when driven in the clockwise direction. If the brake were then applied to the vertical sides 82, 82 of the hand wheel, the force exerted on the hand wheel would tend to rotate the hand wheel in a counterclockwise direction, which is the direction the hand wheel was initially rotated to bring the jaws into contact with the work. Thus the brake augments the gripping force otherwise obtained by this device. Conversely, the position shown in Fig. 4 required that the hand wheel be rotated in the clockwise direction and the housing be driven in the counterclockwise direction. Under these conditions the brake would exert a clockwise force on the ring to further increase the gripping force of the jaws.

It will be apparent, therefore, that I have provided a chuck which readily adapts itself to work diameters within a wide range and may be utilized for turning work in either direction. At any time the work may be freed from the grip of the jaws without stopping the machine, thus permitting extremely rapid handling of material. The loads encountered in this construction are not placed on one particular element. Thus the radial load is taken by the jaw pins while the driving force is transmitted through the gearing. The jaws are spring loaded in either direction to facilitate handling and to obtain a strong grip between the jaws and the work while the brake may be utilized to further augment the holding force.

Although but one embodiment of the present invention has been illustrated and described, it will be apparent to those skilled in the art that various changes and modifications may be made therein without departing from the spirit of the invention or from the scope of the appended claims.

I claim:

1. A chuck for centering and holding work comprising, in combination, a housing adapted for rotation by a machine spindle, a ring gear mounted within said housing for rotation therewith, a carrier rotatably mounted within the housing, at least three pins mounted in said carrier and being equally spaced from each other and from the axis of said carrier, a pinion gear mounted on each of said pins and meshing with said ring gear, an arcuate jaw mounted on each pin and adapted to be rocked into engagement with the work at varying distances from the center of its corresponding pin, each of said jaws being fixed with respect to its corresponding pinion gear, and manual means for rotating said carrier within said housing to walk said pinion gears on said ring gear to rock said jaws about the axis of their corresponding pins.

2. A chuck as set forth in claim 1, wherein each of said jaws is rockable about the axis of its corresponding pin in either direction, said jaws having work engaging surfaces adapted to grip the work at varying distances from the center of said pin when the jaws are rocked in either direction from a maximum work diameter position.

3. A chuck as set forth in claim 2 and including spring means acting between said housing and each of said jaws and exerting a force through the center of said pin when said jaws are in said maximum work diameter position and exerting a force eccentrically of said pin when the jaw is rocked in either direction from the maximum diameter position, said eccentric force tending to rock the jaw away from said maximum diameter position.

4. A chuck as set forth in claim 3 and including means for augmenting the gripping force of said jaws.

5. A chuck as set forth in claim 4 in which said augmenting means exert a force on said manual means to augment the gripping force of said jaws on said work while the housing is rotated.

6. A chuck as set forth in claim 5, wherein said augmenting means comprise a brake.

7. A chuck as set forth in claim 1 and including means for augmenting the gripping force between said jaws and the work.

8. A chuck as set forth in claim 7 wherein said augmenting means comprise brake means acting on said manual means.

9. A chuck for centering and holding work comprising, in combination, a housing adapted for rotation by a machine spindle, a ring gear mounted within said housing for rotation therewith, a carrier rotatably mounted within the housing, mounting means on said carrier, at least three work-engaging members mounted on said mounting means and being equally spaced from each other and from the axis of the carrier, gear means associated with each of said members and meshing with said ring gear, and manual means for rotating said carrier within said housing to walk said gear means on said ring gear and rock said members into contact with centrally located work, said members being adapted to engage the work at varying distances from the chuck axis.

10. A chuck as set forth in claim 9 and including means for augmenting the gripping force between the members and the work.

11. A chuck as set forth in claim 10, wherein said augmenting means comprise brake means acting on said manual means.

OTTO M. JENSEN.

REFERENCES CITED

The following references are of record in the file of this patent:

UNITED STATES PATENTS

| Number | Name | Date |
| --- | --- | --- |
| 1,152,175 | Heggie | Aug. 31, 1915 |
| 1,389,974 | Olin | Sept. 6, 1921 |
| 1,562,230 | Guttly | Nov. 17, 1925 |
| 1,635,481 | Jorner | July 12, 1927 |
| 1,713,803 | Whiton | May 21, 1929 |
| 2,465,923 | Premo | Mar. 29, 1949 |
| 2,479,560 | Eaton | Aug. 23, 1949 |

FOREIGN PATENTS

| Number | Country | Date |
| --- | --- | --- |
| 486,345 | France | Mar. 22, 1918 |